Figure 1:
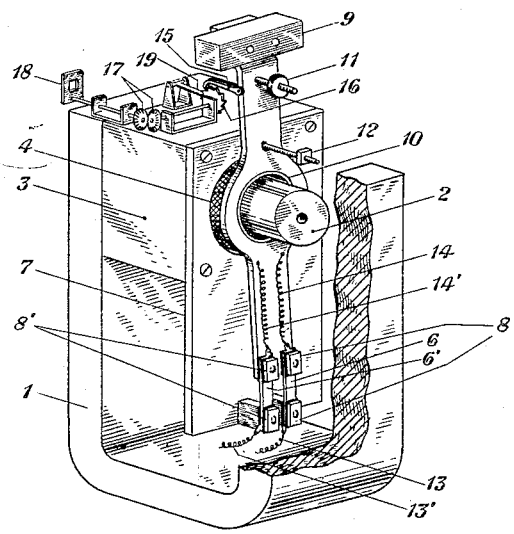

March 4, 1930.  W. H. EDWARDS  1,749,023
METER
Filed Dec. 14, 1927

INVENTOR.
W. H. Edwards
BY
ATTORNEY

Patented Mar. 4, 1930

1,749,023

UNITED STATES PATENT OFFICE

WILLIAM H. EDWARDS, OF FLUSHING, NEW YORK, ASSIGNOR TO AMERICAN TELEPHONE AND TELEGRAPH COMPANY, A CORPORATION OF NEW YORK

METER

Application filed December 14, 1927. Serial No. 239,935.

This invention relates to measuring devices, and more particularly to telephone meters by means of which the subscriber is charged for the length of time his telephone is in actual use.

In such telephone metering systems, it has been the practice to operate the meter periodically by varying the current or reversing the direction of the flow of the current in the telephone circuit. The present invention is adapted for use in connection with such systems.

In general two types of telephone meters have been employed. The balanced magnet type consisted of a double wound solenoid and a U-shaped permanent magnet pivoted to oscillate through a small arc and so balanced that it remained in either extreme position to which it was tilted in order to prevent false operation during interruptions of the line current. In this type of meter increasing the over-balance or the distance through which the center of gravity of the magnet is raised during its movement through the first half of its arc increases the tendency of the magnet to remain in either extreme position, but at the same time increases the amount of energy necessary to cause the movement. This type was open to serious objections. In order to make it sufficiently sensitive to respond to the small line current and at the same time in order to make it sufficiently sluggish in its operation to prevent response to large forces of short duration, for example, mechanical vibration of the meter or the current used for the ringing signals, it was necessary to employ a comparatively powerful and heavy magnet with a small over-balance and delicate pivotal elements. The use of such delicate pivotal elements with such heavy moving parts increased the hazard of damage to the pivotal elements in handling. The use of a small over-balance required very accurate positioning of the meter on its support, for if the meter was tilted, the magnet would be thrown out of balance and when the coil was deenergized, the heavy side, if in the upper extreme position, would restore to its lower extreme position, causing over-registration. Also, the use of a small over-balance increased its tendency to creep out of position due to the vibration of its supporting structure, likewise causing false registration.

The moving coil type, that was hitherto employed, consisted of a stationary permanent magnet having concentric pole pieces and a coil secured to one end of a movable armature which was balanced on a pivot located at approximately the midpoint of said armature. The fact that the armature was pivoted near its midpoint resulted in obtaining a low ratio of the moment of inertia to the weight, whereas it is desirable, in such meters, to obtain a high ratio of the moment of inertia to the weight in order to provide maximum sluggishness of action, with a given weight of the moving parts. In addition, provision had to be made to bring out the leads from the moving coil to stationary terminals. This involved delicate connecting means in order to keep the drag on the armature at a minimum. Also, to obtain sufficient sensitivity of action delicate bearings were employed which were subject to damage, due to handling and were unreliable in operation due to corrosion or dirt.

It is the object of this invention to provide a meter which is sensitive to the small operating line current, which is sufficiently sluggish in its operation to prevent false registration due to the ringing current or mechanical vibration, on which inaccuracies in mounting have a minimum effect and which is inexpensive in initial cost and subsequent maintenance.

Figure 2:
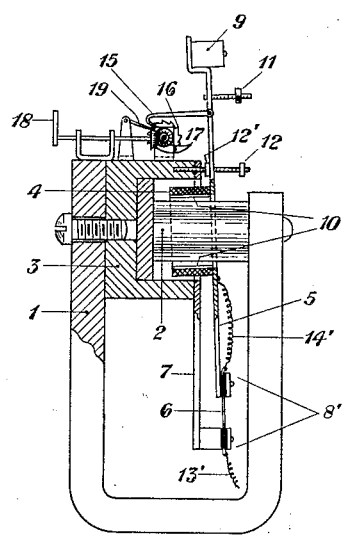
Figure 3:
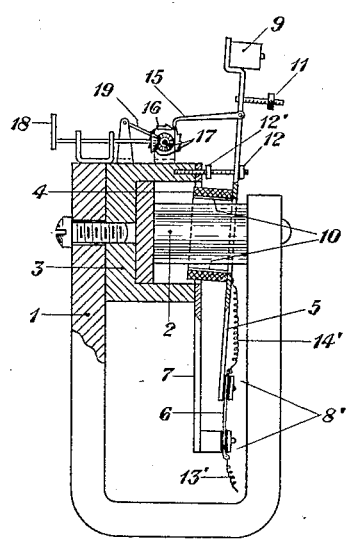

Figure 1 of the drawings is a perspective view of the rear and side of the meter; Fig. 2 is a side view broken away when the moving coil armature is in one of its extreme positions; and Fig. 3 is the same view when the moving coil armature is in the other of its extreme positions. Corresponding elements are indicated by the same numerals.

In the drawings, specifically Fig. 1, the stationary permanent magnet 1 has adjacent or concentric pole pieces, 2 being the inner pole piece and 3 being the outer. Obviously, the strength of this magnet may be increased to any point desired without incurring any disadvantages due to its added weight. The movable armature coil 4 is secured to a coil arm 5 which is supported by spring reeds 6 and 6'. The spring reeds are fastened to the coil arm and the plate support 7, which is preferably made of brass or other similar material, by the clamps 8 and 8'. The mass of the coil armature may be so selected that the moment of inertia will be sufficient to provide sluggishness of action. However, a weight 9 may be located at the end of the coil arm opposite to that fastened to the spring reeds in order to increase the moment of inertia of the moving parts. The resilience of the spring reeds is so proportioned to the weight of the armature that when the armature is operated to either extreme position the bending moment of the weight of the armature will be greater than the restoring moment of the springs, and the armature will be retained in either extreme position. This prevents false operation of the meter when the current is interrupted as when the subscriber attempts to recall the operator by flashing, during dialing, or at the termination of the call, which would occur if the armature restored to the midposition when the current is interrupted. The use of spring reeds avoids the necessity of employing delicate bearings which are subject to damage due to handling and which may become unreliable in operation due to corrosion and dirt. An adjustable means 11 is provided when more accurate balancing is desired. Sluggishness of action with light moving parts is obtained by keeping the radius of gyration at a maximum and by the use of eddy current damping by means of a copper slug 10 inside the coil, which is acted upon by the field of the permanent magnet. A bolt and nuts 12 and 12' are provided to serve as stops when the armature reaches its extreme positions. These stops are made adjustable in order that the arc of vibration of the armature may be regulated.

There is connected to the armature a pawl 15 which operates a ratchet-wheel 16. The rotation of the ratchet-wheel in turn operates, by means of beveled gears 17, a meter drive 18. A holding pawl 19 is provided to hold the ratchet-wheel in its rotated position.

In the particular embodiment shown, there are two spring reeds which are insulated from the armature support and the armature, and which serve as conductors, for example, from the terminal wire 13, to the wire 14, and the winding of the coil 4, and thence back through the wire 14' to the other terminal wire 13'. The use of the supporting reeds as electrical conductors avoids the necessity of employing additional current conducting means with consequent maintenance difficulties and drag on the armature.

Accurate balancing of the armature when manufactured may be obtained by regulating the position of the balancing weight 11. To eliminate the necessity for balancing upon installation at the station, the device may be mounted with the axis of the coil perpendicular to the vertical mounting surface and with the reed supported at the bottom, as shown in the drawings. In this way slight errors in mounting, caused by the installer rotating the device from its normal position when fastening it, will not affect its operators provided the mounting surface is approximately vertical. The wall of the room may serve as the vertical surface upon which the meter is mounted.

The meter is designed so that the armature will be in either one of its extreme positions at all times when the subscriber's telephone is not in use. The operation of the device is as follows: At the beginning of the conversation the direction of the flow of current is, for example, through the terminal wire 13, the spring reed 6, the wire 14, the winding of the coil 4, the wire 14', the spring reed 6' and the terminal wire 13'. The coil is energized in such a way, for example, that the coil is moved away from the position shown in Fig. 2 through the field created between the pole pieces. During the first half of the motion the tension upon the spring reeds assists the movement, but this is counteracted by the fact that the weight of the moving parts must be lifted slightly in its path along the arc of motion. During the latter half of the travel the weight is assisting the motion but the spring reeds are opposing it. The movement of the coil through the field between the two pole pieces moves the coil arm 5 to its extreme position, as shown in Fig. 3. This movement, by means of the pawl 15, rotates the ratchet-wheel 16, which in turn, by means of the beveled gears 17, operates the meter drive 18. When the direction of the flow of current is reversed, the current flows through the terminal wire 13', the spring reed 6', the wire 14', the winding of the coil 4, thence back through wire 14, the spring reed 6 and the terminal wire 13. With this direction of the current the coil moves away from the position shown in Fig. 3 through the magnetic field between the two pole pieces. As before, during the first half of the motion the tension on the spring reed assists the movement, but this is counteracted by the fact that the weight of the moving parts must be lifted slightly in its path along the arc of motion. During the latter half of the travel the weight is assisting the motion, but the spring reed is opposing it. The movement of the coil through the field between the two pole pieces moves the armature arm 5 back into the other extreme position, as shown in Fig. 2. This movement again places the pawl 15 in position to rotate the ratchet-wheel when the current is reversed again.

This invention may be used in connection with systems in which the current is suddenly reversed or where the current is gradually reversed. Also, by providing a spring or by suitable adjustment of the meter so that the coil arm will be restored after operation to the position illustrated by Fig. 2, this invention may be used in connection with systems using pulsating currents to operate the meter. Under certain conditions it may be desirable to bias the meter by a spring or by adjustment of the balance of the armature so that it would tend to restore to or remain in the position to which it is operated by the normal line battery polarity. Furthermore, the use of the meter described is not limited to systems in which the subscriber is charged for the length of time his telephone is in use but may be employed in systems where the charge is made on a message basis.

It is to be understood that this invention, although disclosed in the particular arrangement herein set forth, is capable of being embodied in other forms without departing from the spirit of the invention or the scope of the appended claims.

What is claimed is:

1. In combination, a magnet having concentric pole pieces, a coil armature adapted to move between said pole pieces, and resilient means fastened to and supporting said armature at one end thereof and tending to center said armature at its midposition, the weight of said armature being adapted to counteract the force exerted on said armature by said resilient means.

2. In combination, a permanent magnet one pole piece of which surrounds the other, a coil armature adapted to move through the magnetic field between said pole pieces, spring reeds fastened to and supporting said armature at one end thereof and adapted to exert a force tending to pull said armature to a perpendicular position, the weight of said armature being adapted to counteract the force exerted on said armature by said spring reeds.

3. In combination, a magnet having adjacent pole pieces, a coil armature adapted to move between said pole pieces, and resilient means fastened to and supporting said armature at one end thereof and tending to center said armature at its midposition, the weight of said armature being adapted to counteract the force exerted on said armature by said resilient means.

4. In combination, a permanent magnet having concentric pole pieces, a coil armature adapted to move back and forth through the magnetic field between said pole pieces under the influence of currents of opposite polarities, resilient means fastened to and supporting said armature at one end thereof, a weight positioned at the other end of said armature, whereby said armature will remain only in either extreme position when said coil is deenergized, balancing means for adjusting the bending moment of said armature, and stopping means for controlling the arc of vibration of said armature.

5. In combination with a permanent magnet having concentric pole pieces and a coil armature adapted to move between said pole pieces, resilient means fastened to and supporting said armature at one end thereof and adapted to exert a force tending to pull said armature to a vertical position, the weight of said armature being adapted to counteract the force exerted on said armature by said resilient means.

6. In combination with a permanent magnet having concentric pole pieces and a coil armature adapted to move between said pole pieces, resilient means fastened to and supporting said armature at one end thereof and adapted to exert a force tending to pull said armature to a perpendicular position, said resilient means being insulated from one another and electrically connecting terminal wires with the windings of said coil armature, and the weight of said armature being adapted to counteract the force exerted on said armature by said spring reeds.

7. In combination, a magnet having adjacent pole pieces, a coil armature adapted to move between said pole pieces, resilient means fastened to and tending to center said armature at its midposition, and means for counteracting the force exerted on said armature by said resilient means.

8. In combination, a magnet having concentric pole pieces, an armature supported by pivotal means, and a coil fastened to said armature and adapted to move between said pole pieces, the weight of said armature being adapted to cause said armature to remain only in either extreme position when said coil is deenergized.

In testimony whereof, I have signed my name to this specification this 12th day of December, 1927.

WILLIAM H. EDWARDS.